United States Patent
Ace

(10) Patent No.: US 6,688,129 B2
(45) Date of Patent: Feb. 10, 2004

(54) GEOTHERMAL SPACE CONDITIONING

(76) Inventor: Ronald S Ace, 15706 Bond Mill Rd., Laurel, MD (US) 20707

( * ) Notice: Subject to any disclaimer, the term of this patent is extended or adjusted under 35 U.S.C. 154(b) by 0 days.

(21) Appl. No.: 10/208,823

(22) Filed: Aug. 1, 2002

(65) Prior Publication Data

US 2003/0024685 A1 Feb. 6, 2003

Related U.S. Application Data

(60) Provisional application No. 60/334,080, filed on Nov. 30, 2001, provisional application No. 60/333,123, filed on Nov. 27, 2001, and provisional application No. 60/308,828, filed on Aug. 1, 2001.

(51) Int. Cl.[7] .............................................. F25D 23/12
(52) U.S. Cl. ..................... 62/260; 62/238.7; 137/563; 165/45
(58) Field of Search ................ 62/238.7, 260; 165/45; 137/5, 93, 563

(56) References Cited

U.S. PATENT DOCUMENTS

| | | | | |
|---|---|---|---|---|
| 2,781,174 A | * | 2/1957 | Smith | 237/8 C |
| 3,498,072 A | * | 3/1970 | Stieffel | 62/118 |
| 4,191,348 A | * | 3/1980 | Holwerda | 244/134 C |
| 4,222,244 A | * | 9/1980 | Meckler | 62/235.1 |
| 4,375,831 A | * | 3/1983 | Downing, Jr. | 165/48.1 |
| 4,538,418 A | | 9/1985 | Lawrence et al. | |
| 4,565,161 A | * | 1/1986 | Choquette | 122/32 |
| 4,633,676 A | * | 1/1987 | Dittell | 62/238.6 |
| 4,936,110 A | * | 6/1990 | Kuckens | 62/260 |
| 5,459,890 A | * | 10/1995 | Jarocki | 4/668 |
| 5,524,666 A | * | 6/1996 | Linn | 137/337 |
| 5,727,621 A | | 3/1998 | Hardin | |
| 6,182,683 B1 | * | 2/2001 | Sisk | 137/337 |

* cited by examiner

Primary Examiner—William E. Tapolcai
(74) Attorney, Agent, or Firm—Jones, Tulllar & Cooper, PC

(57) ABSTRACT

An excavationless geothermal system for heating and cooling applications includes a potable water storage container that receives water from a water supply through a supply line and a reversible water meter. The water in the storage container is circulated through a heat pump, and when the temperature of the water in the container is increased or decreased by the heat pump, the water is returned to the supply through the reversible meter.

40 Claims, 3 Drawing Sheets

GEOTHERMAL SPACE CONDITIONING

The present application claims the benefit of U.S. Provisional Patent Applications Nos. 60/308,828, filed Aug. 1, 2001; 60/333,123, filed Nov. 27, 2001; and No. 60/334,080, filed Nov. 30, 2001; the disclosure of which are hereby incorporated herein by reference.

BACKGROUND OF THE INVENTION

The present invention is a very low cost method to insert and extract heat energy to and from potable water using a single pre-existing underground water service pipe, without either consuming or degrading the potable water. Extremely efficient geothermal heat pump space-conditioning installations are made possible without the high cost of excavation or insertion of underground heat exchanger equipment. When combined with on-site fuel cell electrical power and co-generation waste heat, the present geothermal invention becomes even more efficient, consuming only a small fraction of the energy required by prior art systems.

GEOTHERMAL BACKGROUND

The high energy efficiency of geothermal heat pump (GHP) air conditioning is well known. Geothermal renewable energy is dilute, in terms of energy density, but it is still the world's most abundant and most reliable form of stored terrestrial clean energy. The dilute thermal energy density at the surface of the earth compared to many other high energy density sources (such as fossil fuels) makes the immense geodetic heat sink difficult and expensive to access. Despite its dilute energy density, the earth contains far more stored energy than all other conventional energy sources combined. Hence, the pursuit of geodetic clean energy remains a high priority and is completely justified. Unfortunately, its current use hardly registers on the global energy-usage scale for the following reasons. Prior art GHP installations are too expensive; GHP installation-payback is not cost efficient for many years. Prior art GHP systems are also not universally appropriate for all ground conditions such as poor thermal conduction, soil hardness (rock), lack of moisture, and high population density zones (high-rises for example) which do not offer high acreage to tap ground heat. Deep boring and/or long trenching costs represent about half the total cost in a typical geothermal installation, but excavation costs can be much greater in many locations. Geothermal publications abound with sophisticated schemes to drill deep geothermal holes for the insertion of closed fluid loops, back-filled with improved thermal conduction grouting materials. Likewise, the literature overflows with techniques for filling long deep trenches with various thermally conductive loop backfill materials. Even navigationally guided horizontal loop-drilling technology has been developed to drill very long curved loops, where tubing can be pulled into and around a horizontal drilled loop. Furthermore, numerous techniques have been developed to tap the geothermal energy of lakes, rivers, and oceans. Single well (open loop) and multiple well (closed loop) ground water sources have also been exploited, but the use of such geothermal bodies of water still imposes high installation and excavation costs, or longevity shortcomings such as dirt and/or debris filtration problems, and a long list of similar objections.

In other attempts to bring geothermal costs down, elaborate compound geothermal heat exchange systems are being employed. For example, noisy evaporative cooling water towers have been combined with cool ground waters. The cost can be high in large commercial applications, but energy savings are also high. Another high cost example of commercial size geothermal installations—typically in excess of 100–1000 tons (1,200,000 to 12,000,000 BTU/hr)—involves major excavation to access municipal water mains at distant points. Major municipal water flow is interrupted and then diverted with two large pipes directed too and from a large heat exchanger device, forming a large underground ioop within a municipal water system. This type of costly installation requires large earth moving machines for significant earth (and even paved road) excavation, followed by land and road restoration and, of course, the costly permits to interrupt large commercial water mains. Such prior art heat exchange systems claim to be cost effective only in large multi-dwelling housing developments of 40 or more adjacent homes, or in large commercial buildings. The amount of excavation for this special type of geothermal application is high, but can be less costly than excavating many thousands of feet of individual underground heat exchange closed loops for an entire housing development. Such community geothermal installations have additional complex and expensive considerations, such as measuring and metering the thermal usage billed to each dwelling or office connected to the common municipal water system. The many limitations of massive evacuation for heat exchange loops in municipal water mains makes the cost of such complex geothermal methods prohibitive for single residences.

Nonetheless, the availability of effectively inexhaustible stored geothermal energy, the low pollution associated with it, and the low energy cost of using it, continues to beckon us to adopt this largest-of-all renewable clean energy sources—especially if installation costs can be greatly reduced, as disclosed in the present invention.

There is no question that "renewable" geothermal energy is extremely clean, incredibly abundant, essentially free, energy-efficient, and exceptionally reliable 24 hours a day (unlike wind, tide, or solar energy). The temperature of the few hundred outermost feet of the earth—that which is accessed for GHP—is largely governed by years of stored solar energy. In fact, more sunlight energy intersects this planet in one year than all the energy used by mankind throughout history. In that respect, GHP is really just a convenient form of stored solar energy, just as wind and rain energy are byproducts of intercepted solar energy. Geothermally stored solar energy is simply a much more direct solar absorption and heat storage mechanism. High temperature heat energy from deep within the earth's core conducts through the earth's crust and is ultimately liberated from the surface of the earth at a rate of only 15.9 BTUs per hour per square foot. Solar energy heating the earth exceeds 100 watts/ft$^2$, or more than 341 BTUs per hour per square foot, so that incoming solar energy far exceeds the heat losses from the earth's core. The earth's crust has reached an equilibrium average temperature resulting from daily solar exposures and seasonal variations, so "geothermal energy" is better referred to as "geo-solar energy". When that stored solar energy is tapped by geothermal heat pumps, the stored solar energy store is temporarily borrowed in the winter months and is pumped back in the summer months. The highest core temperature of the earth—"genuine geothermal energy", is typically extracted for steam powered electric generators in western territories of the U.S. Unlike other clean renewable solar energy systems (e.g. solar photoelectric arrays), which require massive and very costly man-made energy storage systems when no sunlight is present, "geothermal stored solar energy" is cost free and essentially unlimited year round. Until now, the main obstacle has been that of their high costs of excavation for heat exchange loops.

The principle obstacles to the global adoption of prior art GHP have been the high installation cost and the accompanying long energy-savings payback period. The U.S. government's Department of Energy (DOE) endorses the adoption of various geothermal energy systems and has a goal of increasing geothermal installations to only 2 million by 2005. The DOE also endorses renewable solar energy installations with a similar low target of only 1 million roofs with solar panels by 2010. However, both of these very modest goals reveal how reluctant Americans are to adopt the costly prior art clean energy saving technologies. If geothermal installation costs could be greatly reduced immediately (as with the present invention), and if the ground itself were more universally conducive to geothermal deployment (as achieved by the present invention), then geothermal energy would likely become a much more popular clean energy source far sooner than authorities presently forecast. Cheap clean energy is not just desirable, it's a global urgency. Unlike solar renewable energy, which requires enormous energy storage facilities during prolonged zero-sunlight periods, the geothermal heat sink is available at all places, at all times.

Much more aggressive DOE and EPA goals of perhaps 20 to 50 million geothermal installations (a 50 to 125-fold higher target) by 2010 would significantly register on the national energy scale as well as on greenhouse emission reductions. Unfortunately, the nation would be hard pressed to absorb the resulting installation costs. However, if geothermal installations were less expensive and less limiting, then more aggressive and worthy goals of even more than 50 million installations would be practical. Such a goal would significantly impact national and global greenhouse objectives. Moreover, if geothermal energy can be made far more cost effective, then it follows that other nations might be eager to adopt it as well.

SUMMARY OF THE INVENTION

As will be shown by the present invention, far lower geothermal installation costs, more universal installations, and much higher geothermal efficiencies (than prior art geothermal systems), are now possible. It is estimated that as many as 500 million to one billion dwellings worldwide could readily adopt inexpensive geothermal energy through the application of the present invention, and this would result in a host of benefits to the environment and to the global economy.

An existing underground, geothermal heat exchange, potable water infrastructure already exists which is capable of transporting, delivering, and absorbing ample heat energy to and from buildings using a reciprocating potable water flow to and from dwellings within a single municipal water supply pipe in accordance with the present invention. The present invention uniquely exploits this existing municipal geothermal infrastructure without interrupting, impeding, consuming, or degrading valuable potable water.

The present invention proposes to temporarily draw and store a sufficient quantity of potable water from water mains, during which storage time, dwelling heat energy is exchanged with a quantity of temporarily stored water. Following the heat exchange period, the potable water, with undiminished purity, is forced backward through the inlet water meter so that the net geothermal water consumption registers a net zero consumption. The key to such a low cost potable water heat exchange system resides in the fact that most, if not all, currently installed water meters are, or can be, 100% flow-reversible. With such a reversible meter, potable water flowing one way and registering a positive usage can also be pumped backward to register an equal but opposite negative usage. Thus, cooled or heated potable water, when forced backward through the dwelling's bi-directional water metering device, results in no net water usage recorded or billed. However, the usage of "geothermal water"; that is, the thermal units added to or removed from the potable water, can be measured and can be billed.

The present invention enables the existing underground potable water and sewage infrastructure to serve most of the modern world geothermally, resulting in a rare opportunity to make a cost effective quantum leap in global energy savings, and consequently, a massive reduction in greenhouse emissions without a reduction in the available potable water. Further, once it is known how to cost-efficiently combine the existing potable water infrastructure with the present invention, several other major thermal enhancements also become possible which are not possible with prior art open or closed loop geothermal systems. For example, waste heat from large commercial electric power plants can be thermally coupled into municipal water systems in the winter months, thus raising the potable water temperature delivered to each dwelling and making the heat pump installations of the present invention much more efficient in winter months. Enormous quantities of power plant waste heat could be sold to water companies instead of being released into the atmosphere or nearby bodies of water. Thus, the invention allows low-cost transportation of low-grade (low temperature) power plant waste heat to millions of distant applications. Winter heating, which is a notorious geothermal reduced-efficiency season, can now be made as efficient or even more efficient than summer geothermal cooling. Such increased heat pump winter-efficiency enables the use of even smaller and lower cost individual heat pump systems, while at the same time providing commercial electric power plants and commercial water companies significantly higher profit margins for the wise use of their combined heat energy and existing heat-delivery systems.

In another preferred embodiment of this invention, an on-site fuel cell electric power supply is provided in a dwelling incorporating the potable water geothermal heat pump system of the invention and is incorporated within the system to power the geothermal system as well as supply electric power to the entire dwelling. The electric generation waste heat (e.g. waste fuel cell heat) is used in winter months by the geothermal water-storage system to greatly reduce winter energy consumption. Such on-site co-generation of electricity, heating, cooling, and hot water, makes this unique combination of energy systems far more efficient than prior art heating and cooling systems, makes it the least $CO_2$ polluting, and represents the lowest operating cost installation. It is believed that widespread usage of this invention can meet a large fraction, or even exceed the $CO_2$ reduction goals set by the international Kyoto Accord through conservation, rather than by costly industrial plant modifications.

The key to even hoping to achieve such lofty geothermal installation goals lies almost entirely in three primary objectives of the present invention: 1) installation speed and simplicity—requiring no excavation whatsoever; 2) greatly reduced installation costs; and 3) much higher energy efficiency over prior art geothermal systems. Ideally, an immediate positive cash flow following a geothermal installation should eliminate the final resistance to widespread geothermal installations. If, for example, each geothermal installation cost were low enough so that monthly payments for that installation were less than the monthly energy savings, then a new geothermal system would actually create an immediate net positive cash flow. The possibility of immediate positive cash flow differs from prior art systems, which produce negative cash flow. A very low cost geothermal installation, which is the object of the present invention, is, therefore, capable of removing the final barriers to widespread urban and suburban geothermal usage. As will be shown below, the present invention is far superior in cost-effective payback than prior art geothermal systems, including closed loop and open loop systems, large municipal water underground loop systems, and water tower assisted systems, and is even superior to closed loop wells and lake/pond heat transfer systems.

Almost invisible to most of us, and for well over a century, this nation and much of the rest of the industrialized world have been very busy building an extensive underground municipal water plumbing infrastructure, which is ideal for tapping the immense geodetic heat sink. The U.S. alone has an estimated one million miles of large diameter underground plumbing—all of which can be excellent geothermal heat exchangers, as will be made evident by the present invention. It must be emphasized that potable water is a costly commodity which is becoming scarce, and should definitely not be wasted on geothermal energy applications. The present invention does not waste potable water at all.

Therefore, one key objective of the present invention is a very low cost method to extract/insert heat energy from/to potable water using a single pre-existing underground water service pipe, without either consuming or degrading the potable water. The huge underground infrastructure of existing potable water plumbing is used to extract immense geothermal energy, and can also cost-effectively tap even more geothermal energy from lakes, rivers and oceans, as well as waste heat from commercial electric power plants. The existing infrastructure is a veritable treasure of nearly free geothermal energy. The present invention teaches general ways that this geothermal energy can be readily tapped and applied to almost any dwelling which is served by commercial water, or served by any source of community potable water, while completely eliminating the expense of digging, drilling, and plumbing the terrain near each building. As will be more fully appreciated below, the present geothermal invention consumes zero additional potable water, as there is no net increase in water usage billing to each geothermal energy user. Relatively small quantities of geothermal potable water are merely briefly "borrowed" from the underground water infrastructure, heat energy is then extracted or injected from/to it (depending on cooling or heating needs), and then it is returned to the underground infrastructure as unaltered clean water. Once the "borrowed" clean water is returned to the underground main potable water supply, it again naturally equilibrates with the underground average thermal conditions on its way downstream to other geothermal energy users.

Another significant objective of the present invention will be that of using the same existing underground plumbing infrastructure to transport most of the nation's commercial electric power plant low grade waste heat directly to residential and commercial dwellings, thereby significantly improving geothermal heat pump efficiencies far beyond prior art geothermal heat pump system efficiencies.

Finally, the invention uniquely combines geothermal space conditioning with fuel cell technology to generate low cost on-site electricity while applying the fuel cell waste heat to geothermal winter heating, the latter being impractical with prior art underground geothermal loops.

Commercial electric power companies generally have had a net efficiency of only about 25% because the power plant itself is only 30% efficient in generating electricity and the power distribution grid, with its many transformers, often has only about 90% efficiency. Such a huge waste of energy and liberated $CO_2$ can be almost completely eliminated with on-site electrical power generation. On-site electrical power generation, even if only 40% effective, eliminates the distribution inefficiencies and therefore can be as much as twice as efficient as commercial power systems, and in addition, waste heat from on-site electrical generation can be used at the same site for winter heating and/or for partial hot water generation. Fuel cell technology, for example, is now capable of over 40% efficiency in converting fossil fuels directly into electricity silently and with no moving parts, so fuel cells in combination with the present geothermal invention make an ideal and unique combination which represents a preferred embodiment of this invention.

The very hot core of the earth is slowly cooling through the outermost crust at an average rate of a mere 15.9 BTUs per square foot per hour (4.66 watts/ft$^2$). However, the earth's surface is also being solar heated half of every day with a much higher energy density of >100 watts/ft$^2$. Therefore, 'geothermal energy' at the earth's surface is actually naturally stored solar energy, for the most part. The thin outer geothermal crust—the part which is within relatively easy reach for heat exchanging—typically averages 50 to 70 degrees F. (depending largely on latitude). The shallow ground temperatures tend to equilibrate close to the average annual air temperature (winter/summer) at each latitude. However, very localized abrupt thermal ground conductivity variations (and heat exchange capacity) can occur in earth borings as close as a few feet apart. Some dry soil and rock formations have poor thermal conduction whereas others nearby are excellent, making the effectiveness of conventional geothermal systems unpredictable. A more ideal underground geothermal heat exchange configuration would be a physically large system, such as a municipal water system, wherein flowing water tends to average the various local ground thermal conduction properties. Tapping a large underground potable water infrastructure, as proposed by the present invention, ideally meets that temperature-averaging objective.

Although the stored geothermal energy in the earth is an immense source of energy, it also can be thought of as an immense heat sink for thermal energy storage. Geothermal space-conditioning in accordance with the invention involves the mere "borrowing" of geothermal heat energy from the earth in the winter to heat buildings, and returning most of it back to the earth in the summer months. The heat energy which is swapped to and from the earth is "pumped" up a few degrees F. in the winter months to heat dwellings and in the summer months heat is "reverse pumped" down a few degrees F., causing the summer heat to flow back into the earth. The key to efficient deployment of geothermal heat exchange as described herein is the phrase "a few degrees". If, for example, the average ground temperature were 60° F. in the winter, the geothermal heat must be pumped up a few degrees to maintain a comfortable 75° F. indoor temperature (a mere 15° F. difference). Under such mild winter conditions, geothermal heat pumps in accordance with the invention would barely be taxed to accomplish that goal. By comparison, prior art air-exchange heat pumps offer much lower efficiency in pumping outdoor winter heat from 10° F. outside air up to 75° F. indoor temperatures (a 65° F. difference). A similar comparison arises in the summer months. If a heat pump must eject heat to the outdoors from a 75° F. dwelling to a hot (e.g. 100° F.) summer environment, the work performed by an air-to-air heat pump against a 25° F. temperature difference is much greater than a geothermal heat pump moving 75° F. heat to a cooler 60° F. ground temperature. Depending on the heat pump's electrical efficiency, the local outdoor temperature conditions, and the local geothermal temperature, geothermal assisted heat pumps are much more energy-efficient than common air-exchange heat pumps and many times more efficient than fossil fuel systems. The concepts of extremely high annual efficiency and 24 hour reliability, are the central attractions to all geothermal space conditioning.

However, the previous simplified thermal examples do not reflect reality. The fact is that ground temperatures are not constant year round at 60° F. Ground temperatures can vary to lower than 40° F. and higher than 80° F., depending on depth, season, geographic latitude, and ground thermal conductivity. It is obvious that installations where the ground temperature is very cold (e.g. 40° F.) in the winter months, geothermal heat pump systems cannot be as efficient as installations where winter ground temperatures are much higher (the higher, the better when extracting ground heat). Likewise, geothermal installations are not as efficient in locations where the summer ground temperatures are nearly 80° F. When injecting heat energy into the ground, the highest geothermal efficiency occurs when the ground temperature is coolest.

For most populated locations, ground temperatures average around 55° F. to 80° F. in summer months, and prior geothermal installations are very efficient in summer months in these locations. But prior art geothermal systems are not economically attractive nor as energy efficient in winter months for several reasons. When extracting ground heat from cool winter-ground, the surrounding ground gets even colder. If the winter ground temperature is already cold (e.g. 40° F. to 55° F.) and additional heat energy to heat dwellings is extracted, the ground temperature decreases, making geothermal efficiencies further decrease. For example, if the winter ground temperature were normally 45° F., and a geothermal heat pump extracted additional ground heat which lowered the average ground temperature to, for example 35° F., then the geothermal system would be inefficiently working against a 45° F. to 55° F. temperature differential in the winter. Hence, winter geothermal efficiency is lowest when BTU demand is highest. Despite better thermal insulation, residential BTU heat energy needs in the winter may be 10–12 times greater than cooling energy demands in the summer. Although prior art geothermal heat pump installations can be energy efficient, they are least efficient in cold climates—exactly where heat energy is needed the most. There is an exciting practical solution to this geothermal winter efficiency dilemma—using winter electricity waste heat to increase geothermal efficiency.

As discussed above, electric power plants exhibit electrical generating efficiency ranging from as low as 30% to as high as 57%, resulting in a great deal of waste heat at the power plant that costs the utilities money to dissipate. Waste heat is low-grade heat, but it must be dissipated year-round, and a major obstacle preventing the wise use of that waste energy has been a lack of a cost effective heat delivery system to consumers. There are many electrical power plants that do sell very small quantities of waste heat to nearby heat consumers, such as steam heat energy for local building space heating. But the lowest grade electric waste heat, which represents the preponderance of electrical power, has never been of any practical value, until now. In accordance with the invention, the electrical power waste heat is cost-effectively delivered in winter months for geothermal heat pumping via the existing underground potable water systems. Prior art geothermal systems with underground heat exchange loops cannot efficiently use commercial waste heat delivered via municipal water systems because most of the waste heat energy would be lost in the ground loop. The present invention has no ground loops nor ground loop loses.

Therefore, another major object of the present invention is a practical and cost-effective method to distribute and employ a large portion of electrical power plant winter waste heat in a form that can dramatically increase winter geothermal heat pump efficiency, while allowing electrical power plants an opportunity to become more profitable by selling waste heat. The net effect of such a wise use of this abundant energy resource is that of greatly reducing energy costs to geothermal end users and further reducing greenhouse emissions. The proposed power plant waste heat delivery system is the existing potable water delivery network.

Likewise, electrical waste heat occurs if fuel cells are used to generate on-site electricity. It has been proposed to use on-site fuel cell waste heat for year-round domestic hot water. However, if the electricity demand happens to be low, then the hot water production will be insufficient in that dwelling. Fuel cell waste heat hot water is therefore unreliable. Fuel cell waste heat has never been applied to prior art underground loop geothermal space heating systems because much of the electrical waste heat would be lost to the underground loop heat exchange system. There are several unexpected benefits in applying fuel cell waste heat to the present geothermal invention. For one example, fuel cell waste heat can be fully applied to space heating because space heating has a much larger and continuous demand than hot water. Secondly, the present invention offers no underground loop heat losses. The non-obvious combination of fuel cell co-generation and geothermal heat pumps is a most ideal and efficient marriage and is a highly preferred embodiment of the present invention.

Another source of waste heat available for use with the present invention is found in the discharge of sewer water. The average volume of discharged gray water per household is approximately 200 gallons per day, at an average temperature of 80° F. Prior art heating systems do not recover this energy, primarily because the gray water temperature is not high enough; however, the heat pump used with the present invention can recover this energy, for additional and significant energy savings.

The present invention has a large number of unexpected benefits besides the obvious space heating, cooling, and hot water energy efficiencies. To address the full range of geothermal benefits, the basic premise of the invention will be discussed first and the many unexpected benefits will be addressed one by one.

BRIEF DESCRIPTION OF THE DRAWINGS

The foregoing and additional objects, features and advantages of the invention will be more clearly understood from the following detailed description of preferred embodiments thereof, taken with the accompanying drawings, in which.

DETAILED DESCRIPTION OF PREFERRED EMBODIMENTS

Figure 1:
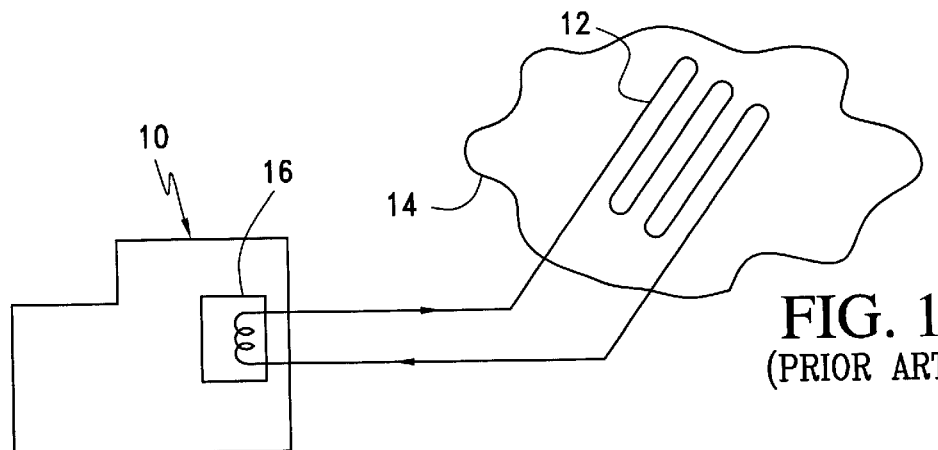
FIGS. 1–5 are diagrammatic illustrations of prior art geothermal systems.
Figure 2:
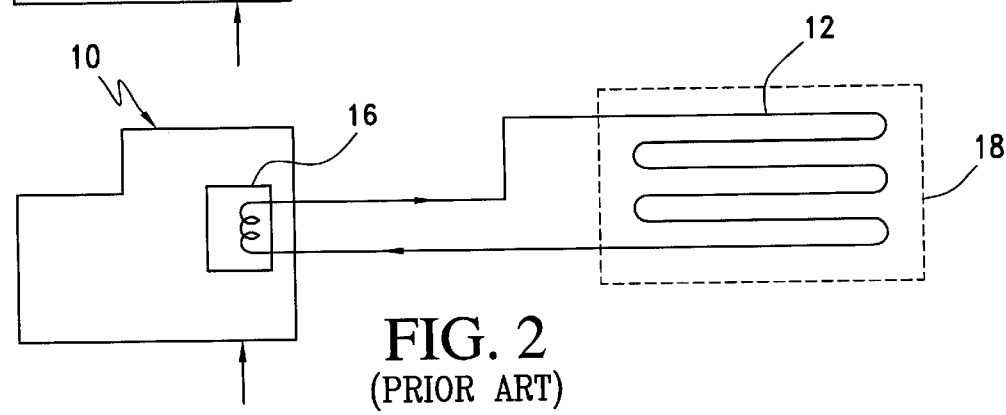

FIGS. 1–5 each illustrate a conventional enclosure 10 having a space that is to be heated or cooled, and which may be a dwelling unit, such as a house or apartment building, or may be an office or office building, or any other structure, but which, for convenience of illustration, may be a conventional single-family dwelling house. In FIG. 1, the house 10 is geothermally heated or cooled by water circulating between a conventional or pond loop 12 located in a pond or lake 14 and a geothermal unit or heat exchanger 16 located in the house. Such prior systems are not very economical to install, and if the pond is at least eight feet deep it can provide an effective transfer of heat to and from the house. As illustrated, a coiled pipe 12 is placed in the water, and usually covers about one-half an acre, an average home requiring about 900 feet of pipe.

Where a pond or lake is not available, as illustrated in FIG. 2, the loop 12 may be placed in earth trenches 18, if the soil conditions allow conventional excavation, and if space permits. Trenches are normally about five feet deep, with multiple pipes placed in the trench at different depths. Usually several hundred feet of trench are required.

Figure 3:
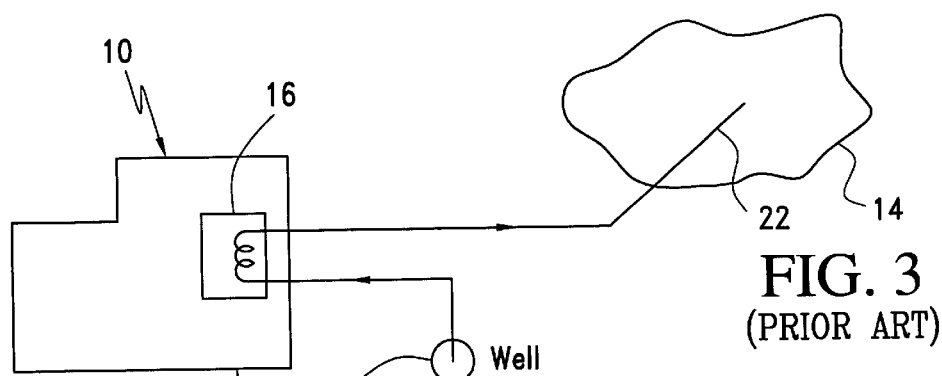

Another option for prior art geothermal installations is illustrated in FIG. 3, which is referred to as an open loop installation. In this case, water is pumped from an underground aquifer through a well 20, passes through a suitable heat exchanger 16, and is then discharged through an outlet line 22 into a pond 14, a drainage ditch, a return well, or the like. The geothermal unit, or heat exchanger 16, processes the heat energy from the water just as is done in the closed loop system described in FIGS. 1 and 2.

Figure 4:
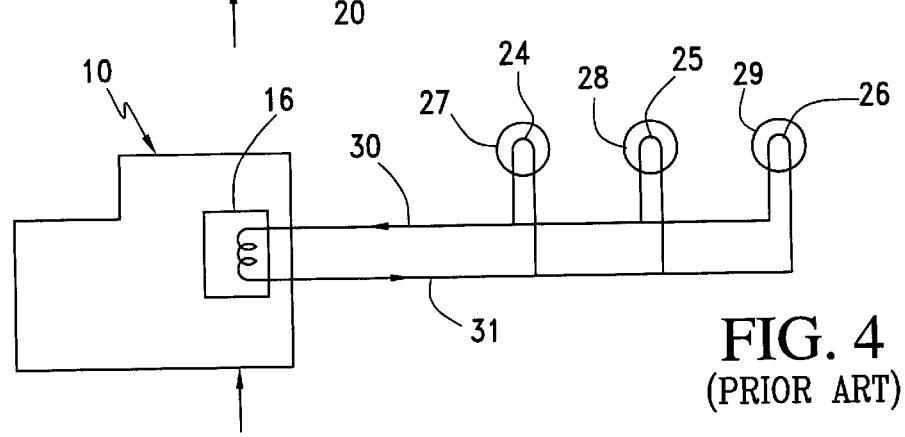

Still another prior art system is illustrated in FIG. 4, wherein vertical loops 24, 25 and 26 inserted into corresponding wells 27, 28 and 29 are connected to the geothermal unit 16. Each vertical loop may consist of a pair of pipes connected together at the bottom of a well by a U-bend assembly, and connected at their top ends to outflow and return lines 30 and 31. The wells may typically be between 150 and 250 feet deep, and are backfilled with a grout solution to ensure good thermal contact with the earth.

Figure 5:
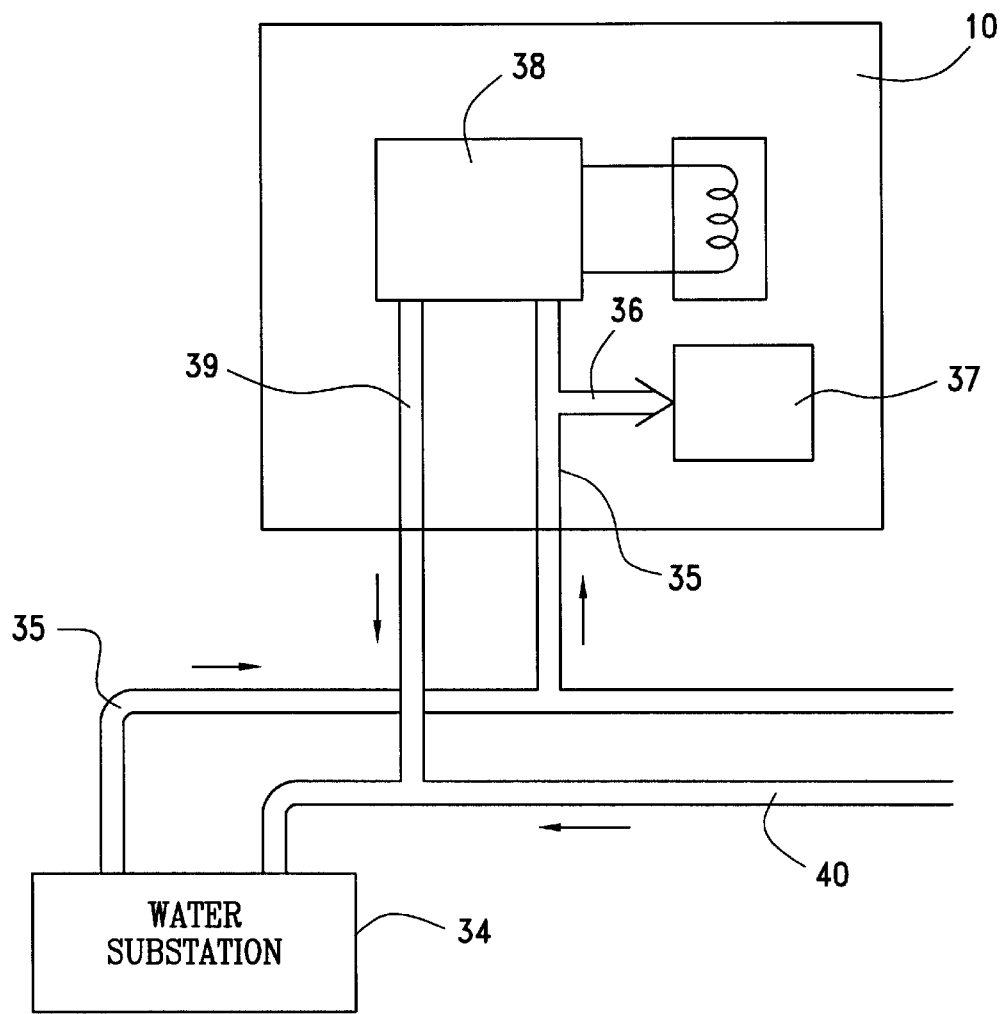

Still another prior system is illustrated in FIG. 5, wherein water from a commercial water source, such as substation 34, is supplied through water main 35 and dwelling intake line 35 to the household water system 37 and to a heat exchanger supply 38. The water used in the heat exchanger supply is returned through an outlet line 39 to a dedicated return main 40. This system requires the construction of a complete return main, with the attendant expense.

Figure 6:
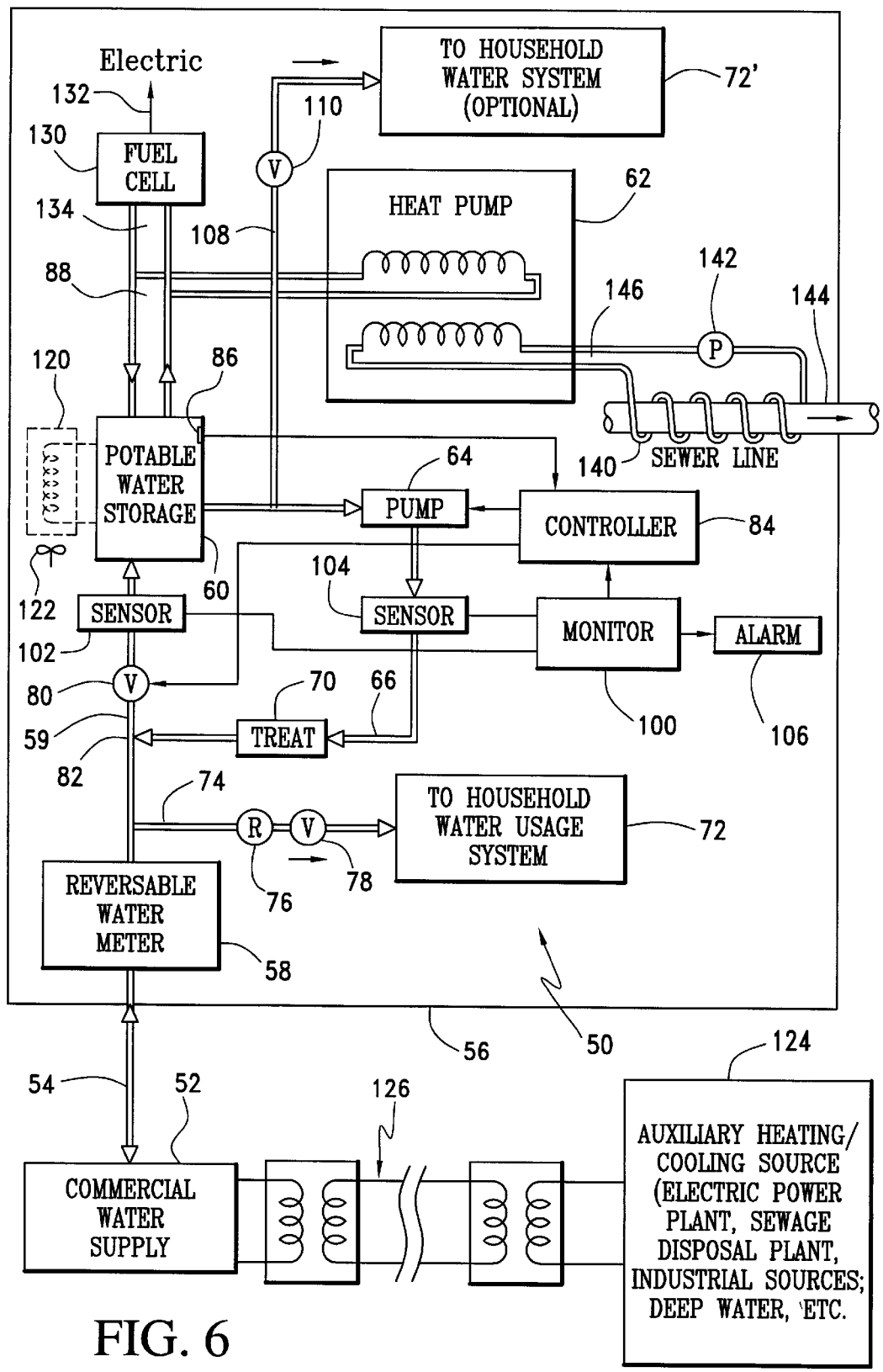
FIG. 6 is a diagrammatic illustration of a geothermal heating and cooling system in accordance with the present invention.

Although such prior systems have many advantages, installation expenses can be high, often requiring extensive excavation with attendant property damage and restoration costs. The present invention, on the other hand, gains the benefits of geothermal systems without the need for, or the disadvantages of, excavation. Instead, as illustrated in FIG. 6, a geothermal assisted heat pump system 50 of the present invention produces an extremely efficient heat pump without the high cost of prior art digging, boring, or excavation of the earth surrounding each geothermal installation. The existing immense underground commercial water infrastructure 52 is already more than adequately sized to act as an underground geothermal heat exchange system, without wasting the potable water or being billed the high cost of potable water.

In accordance with the present invention, the commercial water supply 52, which may be an existing municipal water system, is connected through an existing potable water supply line 54 to a dwelling 56, and through a reversible water meter 58 in or near the dwelling and through water line 59 to periodically fill a modestly sized potable water container 60 located near a heat pump 62 such as a conventional compressor-type heat pump. The potable water in container 60 is required to either give up heat to the heat pump 62 in the winter, or alternatively, act as a heat sink for the heat pump in the summer. The slightly heated or cooled small amount of borrowed potable water in container 60 is then forced backward by a pump 64 to the waterline 59 and through the dwelling's reversible water metering device 58, resulting in no net water usage recorded or billed. Thus, the present invention is able to use a single existing water supply pipe 54 to fill an on-site geothermal water reservoir 60. The very same supply pipe is then used to return potable water to it's source, so a closed loop is not required; no earth excavation is required; no buried geothermal materials are required; no special construction permits are required; and weather-related installation delays are eliminated. By using a completely reversible flow-meter device, the temporarily borrowed 'geothermal potable water' can be returned to the commercial water supply 52, creating no net water consumption.

The existing underground potable water infrastructure is large enough to serve the major population centers of the country geothermally, resulting in an opportunity to make a quantum leap in national energy savings and greenhouse emissions reduction, using the most efficient heating and cooling technology presently known, and without depleting the national water supply.

In its simplest form, the present invention draws a modest volume (e.g. 100 gallons) of potable commercial water from the main underground potable water supply lines, into a pressurized storage container 60 located at the geothermal installation dwelling. The dwelling water meter will register, in the example, 100 gallons of usage. The borrowed water will arrive at container 60 with the average local underground temperature. For simplicity, it can be assumed to be potable water at 65° F. (18° C.). Because of the heat capacity of water, 100 gallons has a heat capacity of approximately 1.7 million joules per degree C. To change the temperature (up or down) of 100 gallons of water by 10° C. requires 17 million joules of energy added (or subtracted) from it by the heat pump 62. That amount of thermal energy is equivalent to adding or subtracting ~4.72 KW of electrical heat for one hour (about 20 amps from a 220 volt power source). Also, 17 million joules is equivalent to ~16,100 BTUs, which is enough energy to cool a typical residence for half an hour to an hour.

At that point, if the 100 gallons of unaltered potable water (10° C. warmer or cooler) is then pumped back to the municipal water supply through its bi-directional water meter 58, the meter will then subtract 100 gallons from the dwelling's water usage. The dwelling will be charged nothing for "borrowing" 100 gallons for one hour. Over the course of 24 hours, 2400 gallons can be borrowed, geothermal heat extracted from (or injected into it), and 2400 gallons incrementally returned under nearly constant water supply pressure with unaltered water quality. If the 2400 gallons of geothermal potable water were not returned, it would ordinarily cost about $12 per day (or $360/mo. or $4320/year), which would be extremely cost ineffective for geothermal users. With the present invention, it actually would cost nothing. Of course, the water meter would also record the normal water usage in the household, so a part of the water flowing into the average house will not be returned to the water supply if normal water usage in the dwelling is maintained. Roughly 150 gallons per person per day will be used in each dwelling (typically 450–600 gallons a day). That amount of water will not be returned and will still be billed by the water supply company.

The only difference in the commercial water, after returning it, would be its temperature. The small temperature difference will be eliminated as the returned water mixes with the commercial water flow and migrates downstream in the large diameter underground utility plumbing toward the next dwelling. Because of the large diameter underground pipes of commercial water lines, the added (or subtracted) heat energy will be quickly re-equilibrated with the ground temperature, all at no net cost to the geothermal user or the water company. Such underground utility plumbing typically employs 4 to 60 inch diameter pipes with a large effective surface area, and buried many feet (typically 6 feet) underground. There is ample linear footage between dwellings to restore the borrowed potable water back to its normal geothermal temperature before being borrowed again by the next geothermal user downstream.

It is even possible, but not required, to return the borrowed potable water in better condition than when first received. Each geothermal user can be urged, or required, to include in the potable water container circuit; for example, in a return line 66 between pump 64 and meter 58, a water treatment device 70, such as a low powered (4 watt) germicidal lamp to illuminate the commercial water and reduce the number of potentially harmful microorganisms in the water. All downstream water users, and especially those farthest from the water supplier, would receive higher quality water than is normally available in prior art water systems, which usually provides the lowest quality of water at the greatest distance from the supplier.

In the system illustrated in FIG. 6, potable water from the water meter 58 is supplied from water line 59 to the usual water system 72 of the dwelling 56 by way of a household water line 74 connected through a pressure regulator 76 to prevent damage by the outlet from pump 64. In addition, a one-way check valve 78 may be included in line 74 to prevent water in the household system from being siphoned back into the water supply 52 by operation of the pump.

Preferably, a shutoff valve 80 is provided in water line 59 beyond the return point 82 where water from pump 64 is returned to the water meter 58. Valve 80 is closed by a suitable controller circuit 84 when that circuit turns pump 64 on, to prevent recirculation of pumped water back into storage container 60. The controller may operate on a timer to periodically change the water in container 60, or may be responsive to a water temperature sensor 86 in the container. In operation, when valve 80 is opened by controller 84, water from supply 52 flows into the storage container 60. This container preferably includes an air bladder to maintain the same pressure as the commercial water supply. After the temperature of the water has increased or decreased by an amount established at controller 84, valve 80 is closed and pump 64 is activated to return the water from container 60 back to the supply 52. The pump delivers the water from container 60 to line 59 at a pressure slightly higher than the pressure in the supply 52, to empty the container. Regulator 76 prevents damage to the household water system. Thereafter, valve 80 is opened, pump 64 is turned off, and water from supply 52 fills storage container 60. Check valve 78 prevents water from the household system 72 from flowing back into the container 60.

Water from storage container 60 is circulated through the conventional heat pump unit 62 through a closed loop 88, with heat pump operating in conventional manner to extract or to supply heat to the water in container 60 as needed to regulate, for example, the air temperature in dwelling house 56.

Municipal water companies are vigilant monitors of their water quality. Some literally perform hundreds of thousands of costly water quality tests per year. The health of millions of people is at stake. Not only is there an ever-present threat of improperly processed water at the filtration plants and potentially contaminated source waters, water companies are also fully aware of the ever present possibility of intentional contamination by terrorists. These factors lead a prudent potable water supplier to vigorously monitor the water supply at various points along their entire plumbing network. It is currently possible, in principle, for someone to inject a malicious chemical agent at any point along the water system by simply reversing the water flow from any dwelling back into the main supply lines. Everyone downstream from that introductory point would be at grave risk. Currently, water companies employ a relatively ineffective testing system to combat these risks and are therefore very vulnerable.

It is not only advisable, but highly desirable, to conduct many times more water testing than is presently done by each water supplier. In one hour, many thousands of people could be exposed to dangerous or even lethal introduced compounds without anyone's knowledge. Sampling rates many times more than 57 times an hour would be a very desirable feature to each water supplier, especially if such testing were possible, practical, and economical.

The present invention offers the unique opportunity to meet this much higher national water security challenge by incorporating in each geothermal installation 50 a built-in, low cost water quality monitor 100. The expense of this unit could be borne by each geothermal equipment purchaser, not the water provider, if desired. Each of the geothermal users would become a continuous water tester along the entire underground plumbing network. If just the electrical conductivity of the water were monitored at every geothermal dwelling, as by sensors 102 and 104 in the inlet line 59 and the outlet line 66, respectively, connected to monitor 100, this measurement could be used as an indicator that the water has been contaminated, for example, by high concentrations of unwanted chemicals. The installation could be connected to controller 84 to automatically shut down pump 64 and valve 80 and not allow the contaminated water to be returned to the water system if the conductivity of the incoming water materially differed from that being returned to the water mains. For another example, the individual water quality tests could be done with more elaborate devices that test for a range of water pollutants, rather than just changes in electrical conductivity. In addition, electrical conductivity is not the only simple means of testing for gross contamination. The incoming and outgoing water dielectric constant can be monitored and compared by allowing water to pass between plates of a capacitor. Still another monitoring method might involve a simple transmission test whereby visible light, infrared light, or even radio wave transmission of incoming versus outgoing water quality is compared.

If large concentrations of almost any hazardous material were intentionally or accidentally introduced into the water system, this rapid water monitoring system would instantly detect it and shut the contaminated local water supply off from re-entering both the commercial water system and the dwelling. Each geothermal installation could even be configured to provide an alarm 106 to communicate the water quality results to the water company instantly. Eventually, with millions of geothermal users on line, national security could be greatly enhanced as a by-product of the present reciprocating water supply invention.

There are several additional benefits in the simplest example of the present invention. In the summer months, assume that the incoming potable water (at 65° F. or 18° C.) is heated about 10° C. higher. On average, the potable water in the dwelling reservoir will be 5° C. warmer in the process of cooling the dwelling. Instead of returning all of the warmer water back to the commercial water supply, that same warmer (but still cool) water can be circulated from storage container 60 to the water system 72 and used for drinking or cooking, and to serve as pre-warmed water for the hot water heater. Instead of applying higher amounts of cooking energy to heat normal ground temperature cold water to cooking temperatures, some of the cooking heat energy can be supplied by the heat removed from the dwelling GHP output water. The reduced cooking-heat energy represents a small additional savings of about 5° C. on many gallons of cooking water per household. A much larger energy savings occurs if the pre-warmed geothermal water (from space cooling) is directed to the dwelling's hot water supply system.

It is well known that the largest hot water energy savings is derived from the ability of a heat pump to pump heat from the dwelling (air cooling) and directing all of the summer heat into the hot water heater system. That is essentially a free hot water byproduct benefit of summertime geothermal air cooling. Similarly, other uses of potable water such as car washing, clothes washing, lawn watering, etc., can be extracted from the pre-warmed potable water vessel, as by way of water line 108 connected, for example, between container 60 and return pump 64 and leading to the household water system 72 (or selected parts of the system, as indicated at 72') through a valve 110. Such a use of the water in container 60 cools the reservoir with fresh potable water constantly flowing into the geothermal container 60 as it is used (450–600 gallons a day), and thereby making the air conditioning system even more efficient. The very small quantity of actual "cold" drinking water consumed per summer per household (less than 3 gallons a day), is so small as to hardly register on the water meter. That very small amount of potable "cold" drinking water, if so desired, can be chilled with one ice cube, or it can be refrigerated, as is the popular practice of many. "Room-temperature" drinking water in the summer is the only minor undesirable side effect of this aspect of the present invention.

It is even possible to not need or use a heat pump at all for summer cooling with a sufficiently cold geothermal potable water supply. If an over-sized air heat-exchanger, indicated at phantom at 120, with very low thermal resistance is employed, then cool 50–70° F. geothermal water can be used to directly cool dwelling air without further heat pump refrigeration assistance. The only electrical power needed is for a fan 122 to blow air through the fins of an oversized heat exchanger and to circulate the cooled air throughout the dwelling. The cool potable water is still used to absorb the dwelling heat (via its own internal heat exchange) to a closed loop of circulating water through the over-sized dwelling heat exchanger system and potable water vessel. The potable water would still be periodically returned to the underground water infrastructure. In this example, a heat pump would only be employed for heating dwellings.

Wintertime potable water geothermal applications work slightly differently than the above examples. Instead of the pressurized storage vessel of potable water warming about 10° C. before being returned to the water supplier, the potable water will get colder by about 10° C. The rest of the process is the same, although the cooled potable water would not be used for domestic hot water, for cooking, clothes washing, etc., for the use of warmer direct potable water for the hot water supply would reduce the energy demand. When the seasonal temperatures drop below about 60° F., most of the cooled water should be diverted back to the water supplier. However, the use of potable water from the storage container 60 for outdoor and non-domestic uses will help the heat pump extract heat from the resulting higher volume of warm ground-temperature water, which is not recycled. In the dead of winter (e.g. air temperature at −10° C.), relatively warm 40–55° F. geothermal potable water will, of course, insure high heat pump efficiency, compared to trying to extract heat from outdoor cold winter air.

It should also be evident that GHP systems of the present invention can be installed much more rapidly than prior art geothermal systems because no elaborate architectural planning is required, no excavation permits are required, no excavation equipment is needed, no ground temperature test holes are required, no weather-delays are possible, no land surface restoration is required, and far fewer property damage lawsuits are possible (a common problem with large excavation equipment). The present invention also does not interfere with future construction on dedicated underground geothermal land (a potential land devaluation), which is a current negative side effect of prior art underground GHP installations.

Dwellings that are presently served by massive underground water supply infrastructures could immediately adopt the present invention with no limitations. According to a landmark Environmental Protection Agency (EPA) publication, geoexchange systems are the most energy-efficient and most environmentally clean "space conditioning" systems known. (Source: "Space Conditioning: The Next Frontier," EPA 430-R-93-004, April 1993). In that same landmark EPA study, it was demonstrated that prior art non-geothermal heating and cooling technologies consume as much as 4 times more energy than geothermal-assisted heat pump technologies. Moreover, it was determined that a mere 400,000 (about 0.2% of the potential applications) currently installed geothermal heat pump systems in the U.S. are now reducing $CO_2$ greenhouse gas emissions by more than one million metric tons per year (2.5 tons per geothermal installation). That EPA study did not include fuel cell cogeneration energy savings, nor any of the other heating/cooling energy savings now possible with the present invention. $CO_2$ reductions with the present invention could readily exceed five tons of $CO_2$ per year per dwelling. That one million metric tons per year is not the only anti-pollution effect. $CO_2$ is but a fraction of the total anti-pollution impact of GHP on cleaner air, cleaner waters, and richer oxygen atmosphere.

To even hope to expand the number of geothermal "Space Conditioning" applications to 10 s or even 100 s of millions of dwellings, and especially to convince people to retrofit existing dwellings, geothermal installation costs must come down very significantly. To motivate people to dispose of their present completely functional prior art systems, and to ask people to not wait 20 to 40 more years to replace them when their present systems fail, is a hard present-day sell. The principle deterrent to switching to prior art GHP systems has been the many years of negative cash flow resulting from the high total installation costs. The present invention eliminates these deterrents to the immediate adoption of geothermal energy savings by providing sufficiently high positive cash flow, so that the lower monthly energy consumption is sufficient to more than offset the monthly geothermal installation payments. An immediate geothermal payback is possible with the present invention, unlike years in the future using prior art technologies.

As illustrated in FIG. 6, waste heat from an electric power generating plant 124 can be coupled to a commercial water supply 52 through a suitable heat exchange loop 126 for distribution through the water delivery system. This valuable electric power waste winter heat energy makes possible significant winter energy savings by geothermal water users, for instead of delivering winter potable water in the 40–55° F. temperature range, 65–85° F. potable water can be delivered, creating significantly more efficient heat pumps in the high BTU demand winter months. Much higher heat pump efficiency means much lower heating energy costs.

There are at least four incentives for utility companies to install massive numbers of geothermal systems:

(a) the power companies can choose to install geothermal systems in electrically overloaded local districts, thus reducing and balancing their electric loads;

(b) the more geothermal systems installed in their customer base, the more likely they are to sell vast quantities of extremely profitable waste winter heat to local water companies;

(c) ultimately, the final benefit to electric power companies in geothermal installations, is the potential delay of, or elimination of, the need to build additional very costly new power plants, and;

(d) commercial water companies are motivated to cooperate for the 1) profit incentive of the more valuable geothermal water; 2) the increase of higher water quality possible with the present invention's antibacteria UV illumination; and 3) antiterrorist water testing systems.

With the advantageous marriage of very low cost commercial water and electric power waste winter heat, geothermal installations can become considerably more efficient heat pumping machines. Such higher efficiency allows the geothermal heat pump itself to be downsized to a lower powered heat pump.

Onsite fuel cell electric co-generation, illustrated by fuel cell 130 in FIG. 6, is an even more efficient preferred embodiment of the present geothermal invention. The use of commercial water mains to distribute commercial electric power waste heat is very practical and economical, despite the inefficiencies inherent in distributing warmed potable water underground and over long distances. However, the latter commercial power plant waste heat inefficiencies can be totally eliminated with on-site fuel cell electricity co-generation, wherein the energy efficiency (percent) of both the fuel cell and the GeoSolar heat pump compressor increase. As illustrated, the fuel cell produces electricity on electric line 132, while waste heat from the cell is delivered by way of loop 134 to the heat pump 62 to produce a new and very desirable net effect.

An ideal application of on-site fuel cell waste heat is the illustrated cogeneration with the present geothermal invention. Almost all of the fuel cell waste winter heat can be coupled by way of loop 134 to and efficiently absorbed by the geothermal potable water holding tank. First, geothermal heating needs are far greater than hot water needs. Space heating is a continuous need, whereas hot water is not. The present invention does not employ an inefficient underground closed loop of flowing water. All of the fuel cell waste heat can be used by the geothermal heat pump (in winter months). In fact, the present invention, having a potable water holding vessel and no underground flowing closed loops, can even use well water with fuel cell waste heat for co-generation. Therefore, the present invention, when combined with fuel cell co-generation, has applications even in the most rural locations where there is no commercial water nor commercial electricity.

The key to a successful marriage of fuel cell waste heat co-generation and geothermal heating lies in the present invention's reliance on its water holding vessel. Well water can be drawn into the vessel as well as commercial potable water, in which case the heated vessel water is discharged (usually into a second nearby well for replenishment of the ground water table) when (or if) the vessel reaches a predetermined temperature. As detailed above, the preferred embodiment of the present geothermal invention includes the use of potable water and a closed storage vessel with fuel cell co-generation.

In summer months when all of the fuel cell waste heat cannot be absorbed by the geothermal pumping system, and if the supply of hot water is fully met, fuel cell waste heat can be discharged into the atmosphere while still providing low cost electricity to operate the geothermal summer cooling system. The overall efficiency of the combined co-generation geothermal invention has no equal. When they are uniquely combined by the present invention so that the waste heat of fuel cells supplement geothermal winter heating and year-round hot water, the combination can lower utility bills, while drastically reducing $CO_2$ emissions.

The present excavationless invention opens still other opportunities to obtain considerably higher overall efficiency by recovering additional auxiliary heat from other available sources of waste heat, such as sewer lines, electric power plants, sewage disposal plants, or industrial sources such as manufacturing plants or the like. For example, gray water (sewer discharge water) heat can be effectively recovered in winter months through an auxiliary heat recovery loop. Gray water consists of 104° F. shower and bath wastewater; 120° F. dishwasher wastewater; 120° F. clothes washer wastewater; 200° F. cooking water; 72° F. toilet water; plus warm waste water from kitchen and bath sinks. The average volume of discharged gray water per household is approximately 200 gallons per day, or 6,000 gallons per month, at an average temperature of 80° F. In winter months, the incoming potable water temperature can be as low as 40° F. The temperature difference (80° F.–40° F.) represents an enormous winter heat-loss from each building residence. Gray water thermal losses far exceed the combined heat losses from windows and insulation in a thermally efficient and well-designed house. Prior art heating systems are not able to recover gray water heat energy primarily because the gray water temperature is not high enough. A heat pump, as used in the present excavationless system, is necessary for high gray water energy-recovery. The cost to recover gray water energy is comparable to, or less than, the cost of insulating a house, with a very rapid installation cost payback. A few hundred dollars to install a gray water heat exchange coil 140 and water pump 142 on the dwelling waste water line represents the essence of the parts added to the excavationless system of the present invention. If the sewer pipe 144 in an existing building is exposed and readily accessible, a heat exchange water-coil can be wrapped around the 4-inch diameter typical metal sewer pipe. A small, and low powered, water pump can be used to circulate gray water heat from the gray water pipe back to the heat pump 62. Alternatively, a section of PVC sewer pipe can be removed and replaced with a prefabricated gray-water heat exchange section of metal sewer pipe. In all cases, gray water heat is coupled to a circulating loop 146 of water between the gray water pipe and the heat pump. The complete gray-water energy-recovery system can be physically small, unobtrusive, quiet, and extremely efficient.

Winter hot water and heating bills can be significantly reduced with gray water energy recovery. Gray water energy recovery is particularly applicable to the present system because the water storage tank does not couple the gray water energy into a circulating underground loop of water. Other auxiliary heat sources may also be used to recover otherwise wasted heat.

Although the present geothermal invention requires no excavation and is therefore a very economical geothermal installation, it still offers the same well known efficiency advantages as prior art geothermal installations. Depending on local ground water temperatures (latitude) and local commercial electricity costs, geothermal heat pump systems are usually at least 2 to 4 times less expensive (½ to ¼ the cost) to operate than non-geothermal systems. The local cost of electricity usually is the most significant factor in estimating the operating costs of geothermal systems because geothermal heat pumps are electrically powered and so are the ancillary motor-driven ventilation systems for air.

Commercial water service to rural communities falls off sharply when the cost to plumb each rural dwelling exceeds the commercial payback period set by the community potable water producers. With the significantly higher profit incentives to water companies delineated above, it becomes likely that more rural dwellings can be serviced with commercial water and geothermal water cost-effectively. At the other extreme, high-rise urban underground water footage per person is not as great as suburban water supply feet per dwelling. Summertime geothermal heat transferred from high-rise structures to underground potable water systems can, under some conditions, overload the municipal water system (raise the potable water temperature to over 80° F.), resulting in reduced geothermal summer efficiency. However, in big cities, the larger underground pipe diameters have greater surface area exposure to the ground, which compensates for the shorter pipe lengths. These complex geothermal considerations of pipe length vs pipe surface area, vs ground conditions and depth of pipe, are all factors to design into future dense GHP installations If the potable water ground temperature does begin to show signs of rising in temperature and significantly reducing geothermal efficiencies, there are many things that can be done to greatly enlarge the existing geothermal urban capacity by using other existing underground infrastructures for vastly greater amounts of summer geothermal energy.

To greatly expand the existing national geothermal capacity, (if thermal saturation starts to appear in highly populated areas, in the distant future), it is relatively simple and cost effective to thermally bridge the two existing massive underground systems—sewage and potable water. The term "thermally bridge" needs to be emphasized. Potable water plumbing should never be run near sewage plumbing. However, it is quite simple to thermally connect the two systems with a pressurized heat exchanging closed loop capable of carrying heat between the two systems with virtually no chance of both ends of the thermal loop developing a simultaneous contaminating leak, especially if the closed loop maintains a positive pressure within it. A relatively simple and inexpensive thermal loop between potable water and sewage systems can readily exchange thermal energy from one system to the other. Even a densely populated city can double to quadruple its total geothermal capacity with both water and sewage systems cost-effectively thermally linked.

There are still larger expansion capabilities for densely populated areas in the distant future. For example, very cold (40° F.) deep ocean/lake water can be pumped to and heat exchanged with potable water before sending to potable water underground to water customers. (Thus, instead of commercial water at 80° F. delivered to geothermal customers in summer months, 50° F. (or cooler) potable water can be delivered. The geothermal energy savings can be very enhanced. This could easily assist the present invention to geothermally cool an entire large city in the future using potable water as the heat energy carrier.

Finally, in extremely dense population zones, where the potable underground water flow (usage) might not be high enough to carry enough water downstream to cool the next thermal user, the cost effectiveness of adding a circulating potable water closed loop to the urban water system is an excellent cost effective solution. In other words, if thermal saturation of the most densely populated cities is ever approached, and all other easier options have been exhausted, it is possible to take potable water from the end of one potable water pipe system and connect it to the beginning of that same pipe (upstream) and place a water pump in the return loop, so that potable water does not stagnate underground.

There exists one other unlikely urban geothermal situation that could be a problem if GHPs are not installed properly. It is possible that in a single high-rise with many GHP users that potable water from one user (such as a single apartment) will be returned to the mains in that building without ever making it to the ground for the needed thermal exchange. In such situations, it would be necessary to simultaneously reverse pump the geothermal potable water from all (or most) of the separate geothermal vessels (apartments) automatically, so that the bulk of the geothermal water exits the building all the way back underground. Alternatively, one large potable water vessel for the entire high-rise can be sufficiently sized to back-pump potable water all the way to the underground water infrastructure. Moments after all the building geothermal water has been forced out of the vessels and out of the building back underground, new geothermal water can be allowed to refill the individual geothermal tanks, or the one large vessel, and begin the cycle again. Note that water pressure within the building is little changed throughout the entire process because all of the geothermal storage vessels are maintained at constant pressure until they are reverse pumped at slightly higher reverse pressure. Reversing the flow of water back to the mains requires only a slight additional reverse pressure.

In summary, geothermal energy, or more accurately "Geo-Solar" energy, is the largest store of the cleanest, free, renewable energy on earth. The present geothermal invention accesses that abundant energy by using a single existing potable water service pipe connected to the underground water infrastructure, and thereby completely eliminates the extravagant cost of geothermal excavation and heat exchange loops. The potable water storage vessel of the present invention offers a unique opportunity to use it as an energy storage vessel for the waste heat of an on-site fuel cell electrical generator. This unique marriage of the present invention with on-site electricity co-generation is even more energy efficient because there are no winter heat losses as in prior art underground flowing water loops. The present geothermal invention, with water-holding vessels and fuel cells, can even be installed with well-water-sources in rural or wilderness locations. Further, various types of heat pumps can be used with the illustrated system without departing from the scope and purpose described. The thermal capacity of commercial potable water can be increased in the summer months by dissipating excess potable water heat into sewage plant wastewater or into deep nearby bodies of cold water.

The thermal energy content of potable water can be increased in the winter months by purchasing low cost waste heat from commercial electric power companies, waste industrial heat, or recycling sewage disposal plant water heat. Thus, through the judicious deployment of all the massive waste heat transfer opportunities to potable water, it becomes possible to actually regulate the temperature of most of the world's underground potable water infrastructure to about 70° F., (80° F. in winter and 60° F. in summer) and in so doing, enabling much higher heat pump efficiency (much lower electric input heat pump power). The present invention paves the way for staggeringly high energy savings.

Although the present invention has been described in terms of preferred embodiments, it will be apparent to those skilled in the art that numerous modifications and variations may be made without departing from the true spirit and scope thereof.

What is claimed is:

1. A geothermal system, comprising:
   a water storage container;
   a heat exchanger thermally coupled with said storage container;
   a water inlet leading from an underground potable water source to said storage container for supplying potable water to said storage container; and
   a water pump connected to said water inlet for returning potable water from said storage container to said underground potable water source through said inlet.

2. The system of claims 1, further including a water quality monitor for water returned to said source.

3. The system of claim 1, further including ultraviolet radiation treatment means for water returned to said source.

4. The system of claim 1, further including water treatment means for water returned to said source.

5. The system of claim 1, further including reversible water meter connected in said water inlet pipe.

6. The system of claim 5, wherein said water source is a commercial water supply.

7. The system of claim 5, wherein said water source is a well.

8. The system of claim 5, further including an auxiliary heat recovery loop thermally connected to said water container.

9. The device of claim 1, further including an auxiliary heat source connected to add heat to said potable water, said auxiliary heat source being waste heat available from at least one of a group of waste heat sources including fuel cells, sewer lines, electric power plants, sewage disposal plants, or industrial sources.

10. The device of claim 1, further including an auxiliary cooling source thermally connected to remove heat from said potable water, said auxiliary cooling being derived from natural bodies of water.

11. The system of claim 1, wherein said water inlet is a pipe connected to a pressurized municipal potable water source, to said storage container, and to said pump, the pressurized potable water being supplied to said storage container from the pressurized water source, and being returned to the pressurized water source through said water inlet pipe by said water pump.

12. The system of claim 11, further including means for metering the water flow in said water inlet pipe.

13. The system of claim 1, wherein said water inlet is connected in common to said storage container and said water pump, whereby water flow in said water inlet is reversible to supply potable water to said storage container and to return potable water from said storage container to said potable water source.

14. The system of claim 1, wherein said underground potable water source is an underground water pipe system conveying potable water to multiple locations, the water pipe system being in heat exchange relationship with the ground.

15. The system of claim 14, wherein said water inlet is a single pipe interconnecting said underground water pipe system, said water storage container, and said water pump, wherein potable water flows through said water pipe in a first direction to supply water from said pipe system to said storage container and flows in a reverse direction to return water from said storage container to said pipe system.

16. The system of claim 15, further including a reversible water meter connected to measure net water flow in said water inlet.

17. The system of claim 15, wherein said underground water pipe system is at least a part of a potable water source connected in common to multiple water inlets leading to multiple storage containers for heating and cooling multiple enclosed spaces.

18. The system of claim 17, further including an auxiliary heat exchanger connected for heating or cooling potable water in said underground water pipe system.

19. The system of claim 1, further including an auxiliary heat exchanger for modifying the temperature of said potable water in said storage container.

20. The system of claim 19, wherein said auxiliary heat exchanger is thermally coupled to receive waste heat from an electricity—generating fuel cell.

21. The system of claim 1, wherein said water storage container is located within said enclosed space.

22. The system of claim 21, further including an auxiliary heat exchanger thermally connected in heat exchange relation with water stored in said container for receiving waste heat from an electricity—generating fuel cell.

23. The system of claim 21, further including a water usage system connected to said potable water source through said water meter.

24. The system of claim 21, further including a water usage system connected to said potable water source through said storage container.

25. A geothermal system for heating or cooling space, comprising:
   a water storage container connected to receive potable water from a potable water source;
   a heat pump connected to said container and in heat exchange relationship with water stored in said container;
   a water pump connected to said container for returning water in said container to said potable water source; and
   a reversible water meter connected between said potable water source and said container and between said water pump and said source.

26. The system of claim 25, further including a water quality monitor for water returned to said portable water source.

27. The system of claim 26, further including a water treatment means for water returned to said potable water source.

28. The system of claim 25, further including an auxiliary heat exchanger thermally coupled to said water storage container for recovery of heat from heat sources in said space.

29. The system of claim 25, further including a single water inlet pipe interconnecting said container and said pump through said reversible water meter to said potable water source.

30. The system of claim 25, wherein said potable water source is a commercial water supply.

31. The system of claim 29, wherein said potable water source is a well.

32. The system of claim 29, further including a potable water usage system connected to said potable water source through said storage container.

33. A geothermal system for heating or cooling a space, comprising:
- a water storage container connected to receive potable water from a pressurized water source;
- a heat exchanger connected to said container and in heat exchange relationship with water stored in said container and with the space to be heated or cooled;
- a water pump connected to said container for periodically returning water in said container to said source;
- a single water inlet pipe connecting said container and said pump to said source, and single pipe supplying water from said source to said container and returns water from said pump to said source; and
- a reversible water meter connected in said single water inlet pipe.

34. The system of claim 33, wherein said source comprises an underground water pipe system connected to water inlet pipes for multiple containers to provide heating and cooling for multiple spaces.

35. The system of claim 33, wherein said heat exchanger is thermally coupled to a heat pump for cooling a corresponding enclosed space.

36. The system of claim 33, wherein said source comprises an underground water pipe system connected to multiple water inlet pipes each Leading to a corresponding container.

37. The system of claim 27, wherein said water treatment means includes ultraviolet radiation treatment means.

38. The system of claim 25, further including an auxiliary heat source connected to add heat to said potable water, said auxiliary heat source being waste heat available from at least one of a group of waste heat sources including fuel cells, sewer lines, sewage disposal plants, electric power plants or industrial sources.

39. The system of claim 25, wherein said potable water source is an underground water pipe system conveying potable water to multiple locations, the water pipe system being in heat exchange relationship with the ground.

40. The system of claim 25, wherein said potable water source is a pressurized municipal potable water supply connected in common to multiple water storage containers for heating or cooling multiple spaces.

* * * * *